United States Patent [19]

Hollis

[11] 3,753,473
[45] Aug. 21, 1973

[54] GOLF CART WITH OUTBOARD POWER UNIT

[76] Inventor: Roger M. Hollis, 2823 Gulf of Mexico Dr., Longboat Key, Sarasota, Fla. 33577

[22] Filed: Aug. 3, 1971

[21] Appl. No.: 168,663

[52] U.S. Cl............................ 180/19 H, 280/DIG. 5
[51] Int. Cl............................................. B62d 51/04
[58] Field of Search................ 180/19 R, 19 S, 19 H; 280/DIG. 5, 47.17

[56] References Cited
UNITED STATES PATENTS

| | | | |
|---|---|---|---|
| 3,167,146 | 1/1965 | Rudolph | 280/DIG. 5 |
| 3,561,555 | 2/1971 | Carmichael | 180/19 UX |
| 2,706,008 | 4/1955 | Voight | 180/19 S |
| 3,401,951 | 9/1968 | Bloom | 280/47.17 |

Primary Examiner—Benjamin Hersh
Assistant Examiner—John A. Pekar
Attorney—Axel A. Hofgren, Ted E. Killingsworth et al.

[57] ABSTRACT

A collapsible powered two-wheel golf bag cart including a frame, collapsible leg structures on the frame each carrying a ground-engaging wheel, golf bag support means on the frame, a handle on the frame for manipulating the cart, a motor unit detachably supported on one of the leg structures outside of the adjacent wheel including an electric motor, a disconnectible coupling for connecting the motor to drive the adjacent wheel, a battery unit detachably supported on the other leg structure outside of the adjacent wheel, a hand grip on the handle extending transverse to the length of the handle, control means on the hand grip adjacent one end thereof in circuit with the battery and the motor by means of wiring extending through the handle for controlling motor energization and motor speed, and means mounting the hand grip for rotation to dispose the control means laterally at either side of the handle for manipulation by the thumb and/or forefinger of either hand of the golfer.

16 Claims, 15 Drawing Figures

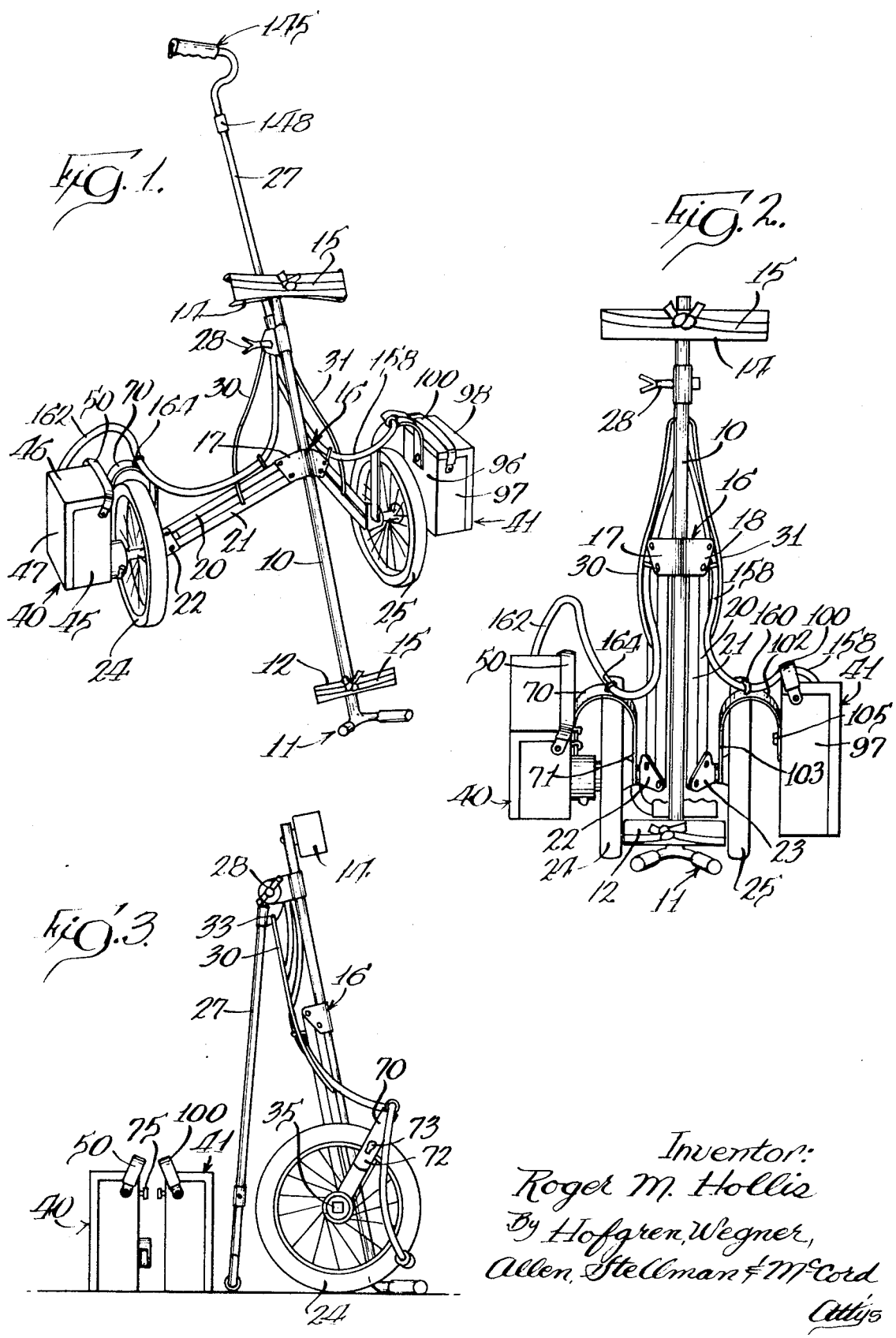

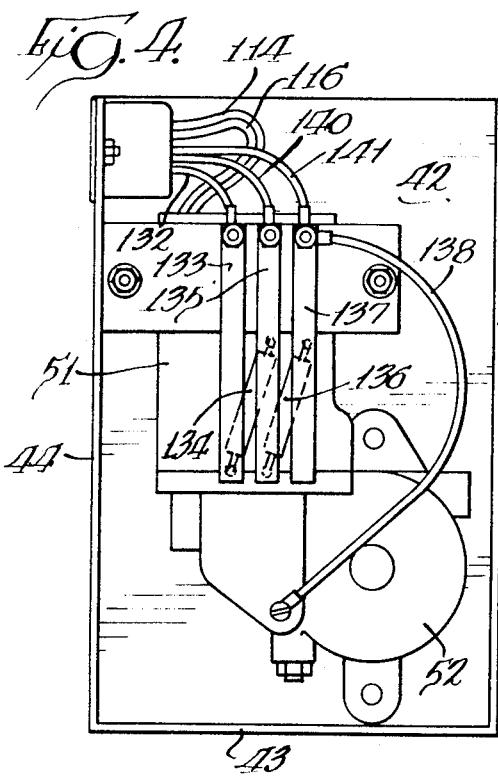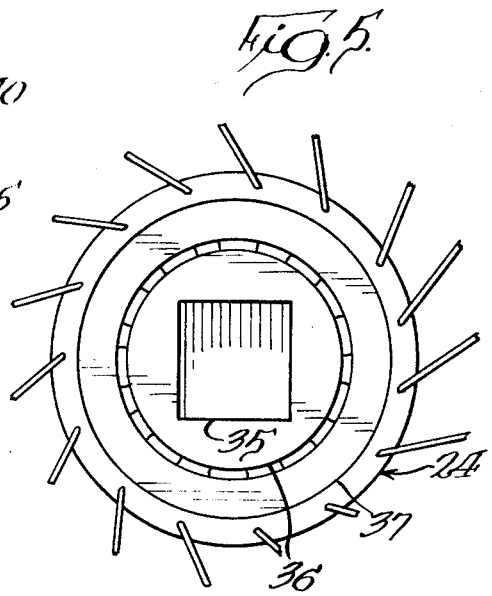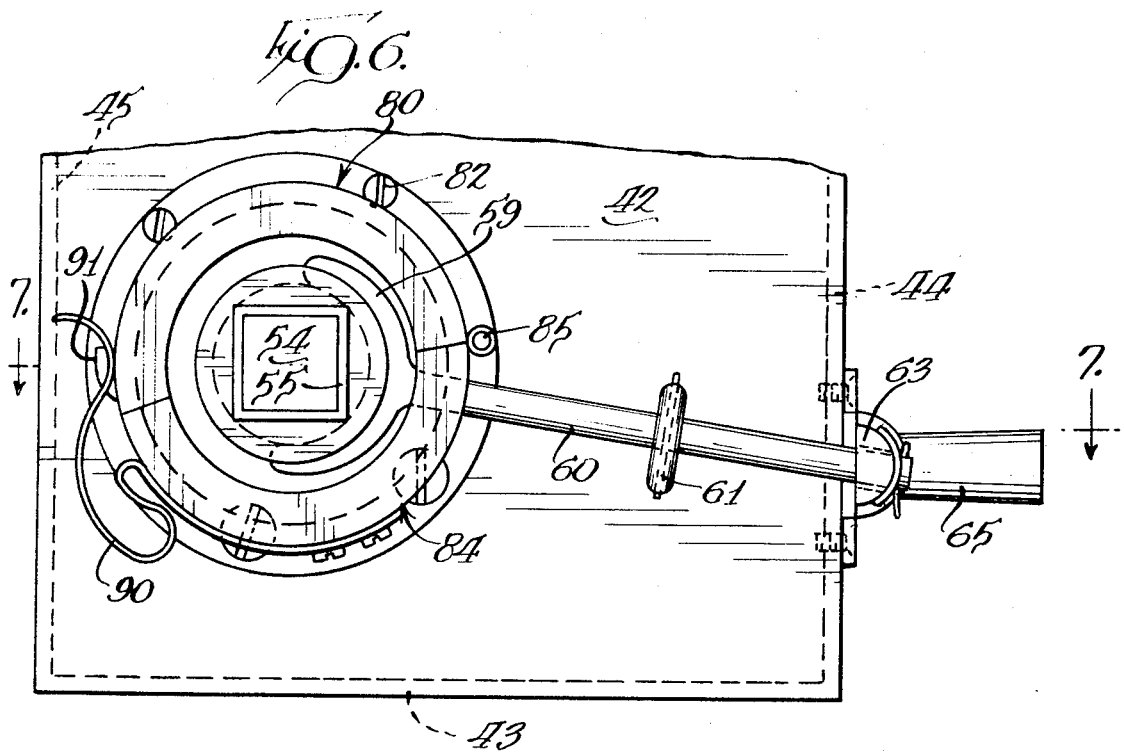

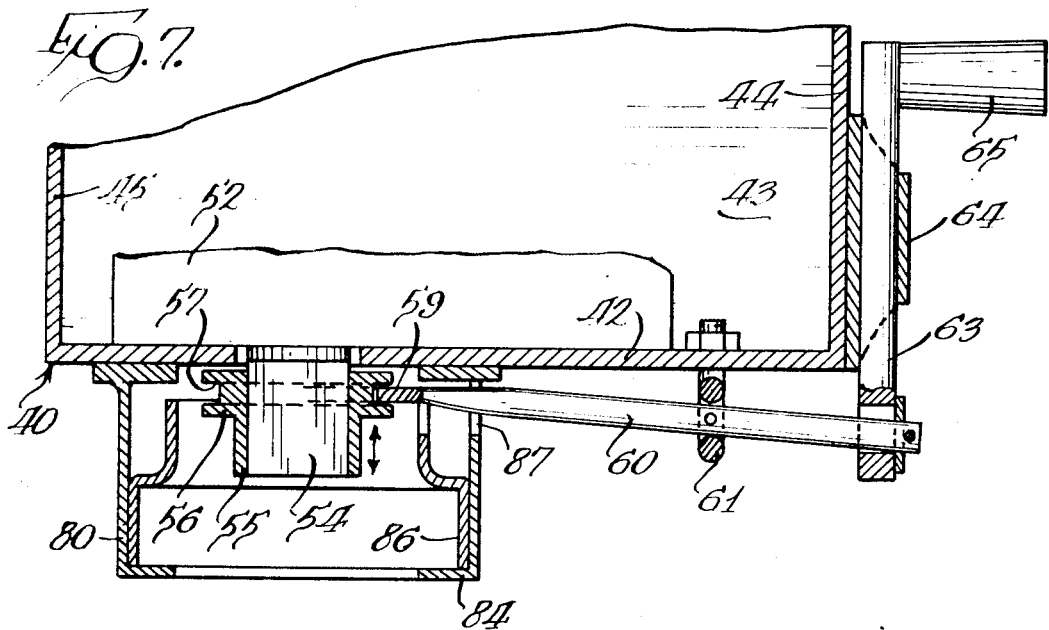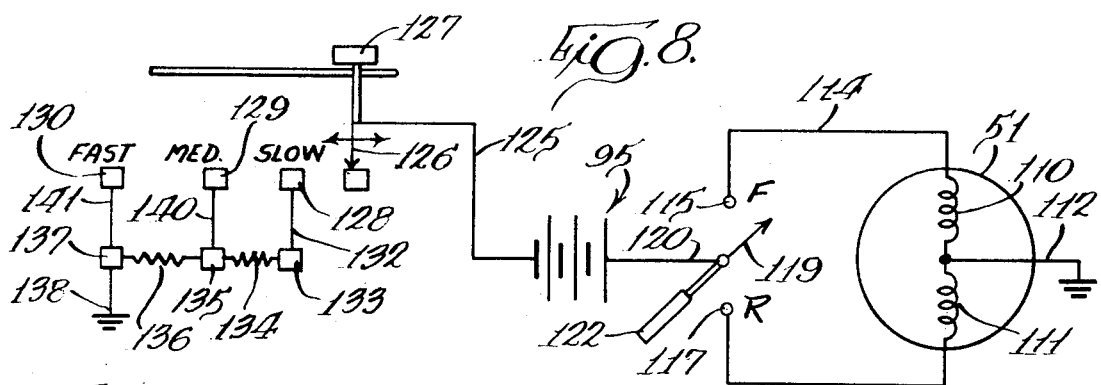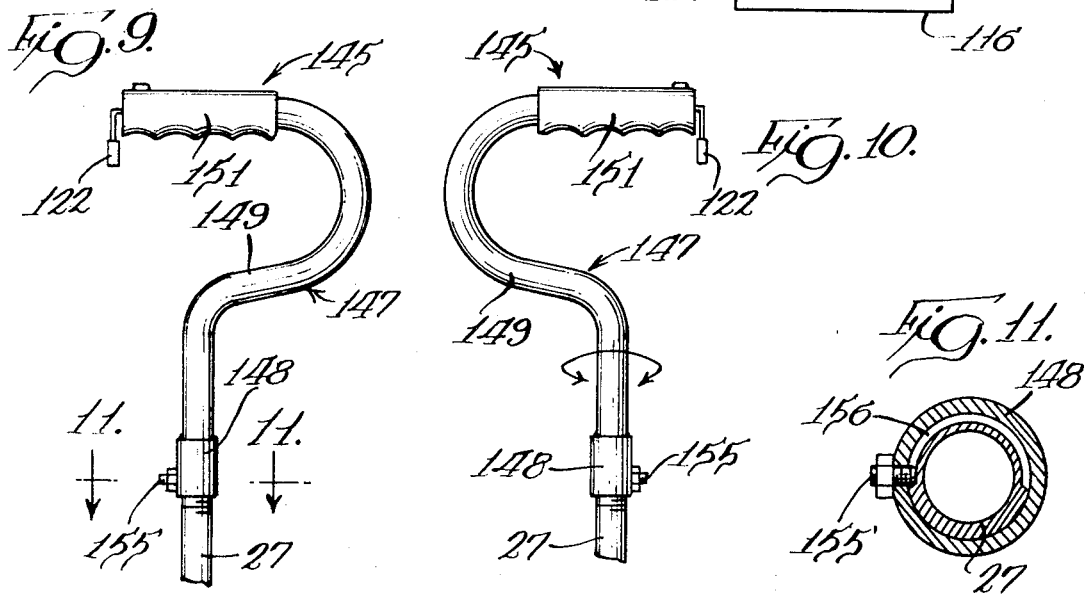

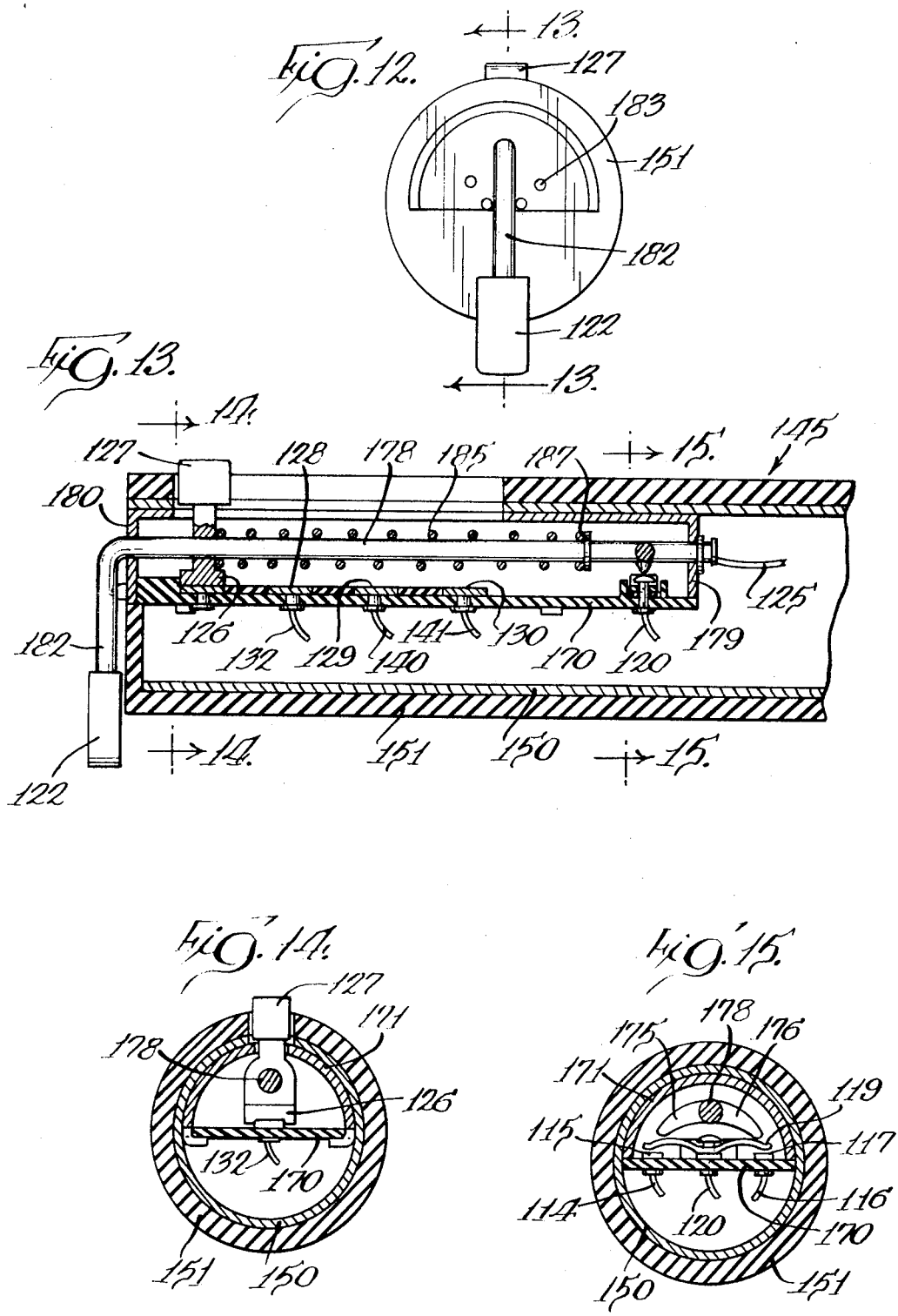

GOLF CART WITH OUTBOARD POWER UNIT

BACKGROUND OF THE INVENTION

For many years, it has been conventional for golfers to utilize personally manipulated golf bag carts for transportation of bags with clubs and other accessories instead of using men as caddies. For the most part, such carts have been of two-wheel construction because of the simplicity and maneuverability afforded by such structures. Usually, a frame is supported by the two wheels in a way such that the center of gravity is located forwardly of the axis of the wheels and the lower end of the frame rests on the ground for stability when the cart is unattended. Manipulation of the cart is facilitated by a handle extending from the frame across the axis of the wheels.

In many instances, two-wheel carts of the type described have been constructed for collapse in a way to encourage private ownership. That is, in extended condition they provide suitable stability and maneuverability for use on the golf course, and at the same time they are adapted to be collapsed into a compact structure requiring minimum storage space so that when they are not in use they may be conveniently kept in a storage place such as the trunk of an automobile.

As time passed and society progressed toward mechanization, power drive was ultimately applied to golf bag carts. However, in providing power units, it often became necessary to add additional frame structure, and in order to support the additional frame structure, it became necessary to provide additional wheel support. Thus, with mechanization came complication which increased the rate and volume and cost and at the same time restricted collapsibility and limited flexibility of use. Also, provision of power required a suitable drive train from the power source to one or more cart wheels, and this resulted in a braking effect in event of manual operation of the cart on failure of the power.

In my prior application filed Apr. 7, 1971, Ser. No. 132,127, I disclosed a powered collapsible two-wheel golf bag cart with a clutch permitting free wheeling in event of power failure and with a detachable power unit mounted between the wheels in a manner permitting removal of the power unit for collapse of the cart.

SUMMARY OF THE INVENTION

It is a general object of the present invention to provide a new and improved golf bag cart which is of two-wheeled construction in order to retain the advantages of simplicity and maneuverability and which is powered by means of a drive unit mounted outside of one of the wheels and generally aligned with the wheel in a manner to preserve the stability of the cart while still providing propulsion of the cart.

More particularly, the present invention contemplates a generally upright central frame having collapsible leg structures each carrying one cart wheel, a power unit supported on one of the leg structures and disposed outside of the adjacent wheel, and means in the power unit connected with the adjacent wheel for driving the latter in a manner which facilitates collapse of the cart without removal of the power unit.

In the preferred embodiment illustrated, the power unit is removably hung on a support extending outwardly over the wheel from the leg structure and detachably coupled to the wheel so that if desired, the power unit may be removed when the cart is collapsed in order to provide compact storage.

As illustrated herein, the power unit is in the form of an electric motor, and power is supplied to the electric motor by means of a storage battery in a battery unit disposed outside of the other cart wheel and supported on a bracket extending outwardly over such wheel from the associated leg structure.

The preferred construction shown herein includes a handle extending from the frame and terminating in a hand grip which includes control means in circuit with the battery and the motor by means of wiring extending through the handle. The controls include an off-forward-reverse switch and a speed control switch in circuit with resistance means disposed adjacent the motor to vary the speed thereof.

An important feature of the invention involves means forming the hand grip disposed in a position extending transverse to the main length of the handle, with the motor controls mounted at one end of the grip for manipulation by the thumb and/or the forefinger of the golfer, together with means mounting the hand grip for rotation to dispose the motor controls at either side of the handle for convenient manipulation by either the right hand or the left hand of the golfer.

BRIEF DESCRIPTION OF THE DRAWINGS

FIG. 1 is a perspective view of a golf bag cart in extended condition with a power unit embodying the principles of the present invention;

FIG. 2 is a front view showing the cart of FIG. 1 in collapsed condition with the power unit still in place;

FIG. 3 is a side view of the cart in collapsed condition, with the motor unit and the battery unit removed from the cart;

FIG. 4 is an elevational view of the motor unit with the outer cover removed, illustrating the interior of the unit;

FIG. 5 is a fragmentary side elevational view of the drive wheel of the cart, with the power unit removed;

FIG. 6 is a fragmentary side elevational view of the motor unit, removed from the cart, illustrating the disconnectible coupling for connecting the motor unit to the drive wheel, and illustrating the disengageable clutch for connecting the drive shaft of the motor unit to the shaft of the propulsion wheel;

FIG. 7 is a fragmentary sectional view taken at about the line 7—7 of FIG. 6;

FIG. 8 is a wiring diagram showing the battery, the motor and the controls in circuit therewith;

FIGS. 9 and 10 show the hand grip portion of the handle in different positions and demonstrate the indexable movement of the hand grip;

FIG. 11 is a transverse sectional view at about the line 11—11 of FIG. 9, showing the mounting of the hand grip on the main stem of the handle;

FIG. 12 is an end elevational view of the hand grip, showing the motor controls;

FIG. 13 is a fragmentary longitudinal sectional view through the hand grip, taken at about the line 13—13 of FIG. 12;

FIG. 14 is a transverse sectional view through the hand grip, taken at about the line 14—14 on FIG. 13; and FIG. 15 is a transverse sectional view through the hand grip, taken at about the line 15—15 on FIG. 13.

DETAILED DESCRIPTION OF PREFERRED EMBODIMENT

Referring now to the drawings in more detail, the collapsible cart construction includes an upright central frame member or post 10 which has a forked lower end portion 11 extending forwardly for supporting the bottom end of a golf bag. Slightly above the forked lower end portion 11, there is an open bracket on the post 10, and at the upper end of the post 10 there is an open bracket 14 which together form a cradle adapted to support a golf bag. Usually, each bracket as at 12 and 14 includes a suitable belt or strap as at 15 for holding the golf bag on the golf cart.

Approximately at the midportion of the post 10 there is a fixed wing-shaped bracket 16 including a left-hand rearwardly and outwardly extending projection 17 and a right-hand outwardly and rearwardly extending projection 18 for pivotally collapsibly supporting the golf cart wheel structure. As illustrated, each of the projections 17 and 18 supports a pivoted linkage including a pair of parallel links 20 and 21 which are substantially vertically disposed when the cart is collapsed. At the lower ends, the links 20 and 21 are pivotally connected to a wheel support bracket 22 on the left and 23 on the right. Each of the brackets 22 and 23 includes an outwardly horizontally projecting suitable shaft respectively for supporting a left-hand wheel 24 and a right-hand wheel 25, the former of which may function as a drive wheel.

The post 10 has a handle extension 27 pivotally mounted thereon and adapted to be locked in adjusted positions by means of a clamp as at 28 which functions at the pivotal mounting on the handle. When the handle is moved upwardly to the position shown in FIG. 1, it occupies a position which makes it convenient to manipulate the cart. When the handle portion 27 occupies the lower position illustrated in FIGS. 2 and 3, it is compactly disposed to facilitate storage of the cart.

In order to extend the wheels 24 and 25 outwardly to the positions illustrated in FIG. 1 for use of the cart, and in order to collapse the wheels inwardly to the positions shown in FIGS. 2 and 3 for compact storage, the links 20 and 21 are swingable about the supporting bracket extensions 17 and 18. In order to operate each of the linkages 20, 21, each link 21 has a pivotal connection with an operating link as at 30 and 31 which extends upwardly to a pivotal connection as at 33 with the handle member 27 eccentric of the pivotal mounting of the handle on the post 10. The arrangement is such that if the cart is tilted forwardly to rest the bag support 11 on the ground, with the wheels 24 and 25 elevated off the ground, the handle portion 27 may be moved between the position shown in FIG. 1 and the position shown in FIGS. 2 and 3 for extending and collapsing the wheel structure. Specifically, it will be understood that if the handle 27 is elevated from the position shown in FIG. 3, the pivotal connection of the handle 27 to the links 30 and 31 as at 33 will pull the links 30 and 31 to swing the linkages 20, 21 outwardly relative to the bracket 16 toward the position shown in FIG. 1. Conversely, if the handle 27 is moved downwardly from the position shown in FIG. 1 toward the position shown in FIG. 3, the links 30 and 31 move the linkages 20, 21 downwardly toward a position parallel with the lower end of the post 10.

In order to appropriately mount the wheels 24 and 25, each wheel support bracket 22 and 23 includes an outwardly projecting stub shaft rotatably supporting the associated wheel through the medium of appropriate bearing means in the wheel hub, so that each wheel is freely rotatable on its supporting shaft. In order to apply propulsion power, the left-hand wheel 24 is formed with a short squared shaft projection 35 (FIGS. 3 and 5) integral with the wheel hub and adapted to function in a disengageable clutch connection with a power unit. In order to detachably mount the power unit, the wheel 24 also includes a bearing comprising an inner race 36 integral with the wheel hub and a relatively rotatable outer race 37 adapted to be embraced by a clamp on the power unit.

In order to provide power for propelling the cart, an electric motor unit 40 is mounted outwardly of the left-hand wheel 24, and in order to provide electric power to the motor, a battery unit 41 is mounted outwardly of the wheel 25. The motor unit 40 includes a housing (FIG. 4) formed with a rear wall 42, bottom wall 43, and side walls 44 and 45. The housing is adapted to be closed by a removable cover including a top wall 46 and a front wall 47. Preferably, the housing includes an inverted U-shaped handle 50 having opposite ends pivotally mounted on the side walls 44 and 45 to facilitate manipulation of the power unit when removed from the cart.

The motor unit 40 includes an electric motor as at 51, together with reduction gearing in a housing structure as at 52 providing a drive train including a squared drive shaft or output shaft 54 (FIGS. 6 and 7) projecting rearwardly through the rear housing wall 42. The outwardly projecting end of the stub shaft 54 is provided with a squared clutch or coupling member 55 slidably mounted on the shaft and adapted for movement between a retracted position illustrated in FIG. 7 and an extended position in which the coupling member 55 also embraces the squared stub shaft 35 on the hub of wheel 24 in order to provide a driving connection from the propelling motor to the wheel 24.

In order to provide for actuation of the coupling member 55 to engage and disengage the clutch coupling, the coupling member 55 is formed with an annular portion 56 formed with an encircling groove 57 adapted to receive the bifurcated end 59 of a clutch actuating lever 60 pivotally mounted in an eyelet 61 secured on the rear wall 42 of the housing. The outer end of the lever 60 is pivotally connected through the medium of a lost motion connection to a slide bar 63 reciprocable in a guide 64 on the housing wall 44 and including a manually accessible knob 65 facilitating clutch actuation.

The housing for the motor unit is removably mounted on the cart by means of a support bracket 70 (FIGS. 1—3) in the form of an inverted somewhat U-shaped member having a lower inner end as at 71 fixed to the wheel support bracket 22. From the end 71, the bracket extends upwardly and then outwardly over the wheel 24 to an outer end 72 formed with an aperture as at 73 in the nature of a bayonet slot for receiving a headed stud 75 projecting outwardly from the rear housing wall 42. In this manner, the motor unit housing may be hung on the bracket 70 for purposes of propelling the cart, or removed from the bracket 70 to permit compact storage.

In order to stabilize the clutch connection of the motor unit to the propelling wheel 24, the clutch coupling member 55 (FIG. 7) is surrounded by a housing in the nature of a clamp structure including a semicircular housing member 80 secured to the housing wall 42 as by screws 82. A semicircular housing or clamp member 84 is pivotally mounted at 85 on the housing member 80. The housing members 80 are formed with an inner annular track or guide 86 adapted to embrace the outer bearing race 37 carried on the propelling wheel 24 in a manner such that the motor unit housing is secured against significant movement relative to the wheel and yet the wheel is free to rotate with the drive shaft relative to the housing. Adjacent the hinge connection 85, the housing members 80 and 84 are formed with an aperture as at 87 for receiving the clutch actuating lever 60. The hinged housing member 84 is adapted to be secured in the closed position illustrated in FIG. 6 by means of a latch in the form of a resilient leaf spring member 90 attached to the hinged housing member 84 and formed with an aperture adjacent its free end adapted to fit over a latch knob 91 on the fixed housing member 80. It will be understood that the motor unit is mounted approximately in line with the wheel 24 so that the center of gravity of the motor unit is aligned with or forwardly of the axis of the wheels in order to preserve the stability of the cart in a way such that it will stand unattended with the wheels on the ground and the bag support 11 on the ground.

In order to provide electric power to the motor 51, battery unit 41 includes an appropriate battery 95 mounted in a housing with walls and a cover similar to the motor unit housing. That is, the housing includes a rear wall as at 96, side walls as at 97 and a bottom wall which is not visible. The housing is closed by a cover including a top wall 98 and a front wall as at 99. Preferably the battery unit includes an inverted U-shaped handle as at 100 having opposite ends appropriately mounted pivotally on the side walls 97 in order to facilitate manipulation of the battery unit when removed from the cart.

In order to support the battery unit in a position disposed outwardly of the wheel 25, a support bracket 102 is provided similar to the support bracket 70 and including an inner end 103 secured to wheel support bracket 23, a midportion extending upwardly and outwardly over the wheel 25 and an outer terminus formed with an aperture to receive a stud as at 105 on the rear wall 96.

In operation, the motor unit 40 and the battery unit 41 enable power propulsion of the cart by means of controls described below. The motor unit and the battery unit are mounted outboard of the wheels and disposed in positions to preserve the stability of the cart so that it will stand unattended. If desired, the cart may be collapsed as illustrated in FIG. 2 to a compact storage position without requiring removal of the motor unit or the battery unit. In order to provide more compact storage, the motor unit and the battery unit may be removed as demonstrated in FIG. 3. In the event of failure of the power propulsion system during use of the cart on a golf course, the disconnectible clutch coupling 55 allows the wheel to be disconnected from the motor and reduction gearing so that the cart will move freely under manual power through the motor and battery remain in place.

The propelling motor 51 and the battery supply 95 are connected in an electric circuit including controls illustrated diagrammatically in FIG. 8. As shown there, the motor 51 includes a winding 110 providing for forward operation and a winding 111 providing for reverse operation. Both windings are connected to ground through a wire 112. The forward winding 110 is connected by a wire 114 leading to a forward contact 115 in a manually controllable switch, and the reverse winding 111 is connected by a wire 116 to a reverse contact 117 in the manually controllable switch. A movable contact 119 in the manual switch is connected by a wire 120 to the battery source 95. The movable switch contact 119 is controllable by a manually accessible actuator 122. In operation, the motor 51 is deenergized when the movable switch contact 119 is in a central position engaging neither of the contacts 115 and 117. The motor is energized forwardly by closing the contact 119 against the contact 115, and the motor is energized reversely by closing the contact 119 against the contact 117.

In order to control the speed of the motor, the battery source 95 is adapted for connection with one or more resistances. In particular, a wire 125 connects the battery 95 with a movable contact 126. The movable contact 126 is adapted to be positioned by a manual knob 127 to engage a first contact 128 for slow operation, a second contact 129 for medium speed or a third contact 130 for the fastest speed. The contact 128 is connected by a wire 132 to a terminal 133 at one end of a resistance 134. The other end of the resistance 134 is connected to a terminal 135 in turn connected to the end of a second resistance 136 having its opposite end connected to a terminal 137 which is grounded at 138. The medium speed contact 129 is connected to terminal 135 by a wire 140 and the fast speed contact 130 is connected to terminal 137 by a wire 141.

In operation, it will be understood that if the movable contact 126 is positioned on the stationary contact 128, both resistances 134 and 136 are connected in series with the battery 95. If the movable contact 126 engages the stationary contact 129, the resistance 134 is bypassed and only the single resistance 136 is connected in circuit with the battery to provide medium speed oPeration of the motor 51. If the movable contact 126 is engaged with the contact 130, both resistances 134 and 136 are bypassed to obtain operation of the motor 51 at its fastest speed.

As seen best in FIG. 4, the resistances 134 and 136 for controlling the speed of the motor are physically located in the motor unit housing adjacent the motor 51 and are physically connected between copper strips representing the terminals 133, 135 and 137, the latter of which is grounded by wire 138. As best seen in FIG. 13, the variable speed control involving the movable contact 126 and the three different speed contacts 128, 129 and 130 are physically located in a hand grip 145 at the upper end of the handle stem 27.

As illustrated in FIGS. 9 and 10, the hand grip 145 extends transversely of the longitudinal axis of the main stem 27 of the handle, and is formed at the terminus of an extension 147 which includes an enlarged tubular base portion 148 rotatably mounted on the upper end of the handle stem 27, a curved intermediate portion 149 of generally U shape and a terminus 150 covered with a rubber grip 151. For purposes which will appear, the base 148 of the handle extension 147 is rotatably mounted on the top end of the handle stem 27 for rotatable indexing movement through at least 180° to dispose the hand grip in either of the two positions shown in FIGS. 9 and 10 where the end of the hand grip projects laterally in opposite directions relative to the longitudinal axis of the stem 27. In order to limit movement of the extension 147 to 180°, the base carries a stud 155 projecting to the hollow interior and formed with a tip slidable in a groove 156 extending around approximately half of the upper end of the stem 27. The tip of the stud 155 engages opposite ends of the groove 156 to limit movement of the extension 147 to 180° back and forth between the positions of FIG. 9 and FIG. 10.

The off-forward reverse switch including manual control 122 is also located in the hand grip 145, and it should be understood that the hand grip, the handle extension 147 and the main handle stem 27 are all of hollow tubular construction permitting the wiring extending from the manual controls to the motor unit and the battery unit to be passed through the hollow handle structure. In particular, the wires 120 and 125 extending from the battery 95 to the handle controls are gathered in a cable 158 (FIGS. 1 and 2) which has at one end a quick disconnect coupling to the battery, an intermediate portion retained at 160 on the support bracket 102, and a substantial length entering the hollow lower end of handle stem 27 and extending therethrough to the hand grip 145. Similarly, the wires 132, 140 and 141 connecting the resistances 134 and 136 to the variable speed contacts in the hand grip are gathered together in a cable 162 having an end portion disconnectibly coupled to the motor unit, an intermediate portion retained at 164 on the support bracket 70 and a substantial length extending through the handle to the hand grip 145.

Referring now to FIGS. 13, 14 and 15, the off-forward-reverse switch and the variable speed contacts in the hand grip are mounted on an insulated board 170 secured to the open bottom of an inverted half cylindrical support member 171 mounted in the upper half of the terminus 150 of the handle extension 147. As seen best in FIGS. 12, 13 and 15, the forward and reverse switch contacts 115 and 117 for controlling the motor 51 are bridged by a movable contact 119 which is normally centrally disposed as shown in FIG. 15, out of engagement with the contacts 115 and 117. The movable contact 119 has a central portion electrically connected with the wire 120 from the battery and opposite ends adapted to engage contacts 115 and 117 respectively. The movable contact 119 is adapted to be actuated by insulated arms 175 and 176 extending laterally in opposite directions from an elongate rod 178 having opposite ends rotatably mounted in opposite ends 179 and 180 of the semicylindrical support 171. At the end of the hand grip 145, the rod 178 is angularly bent as at 182 and carries the manually accessible knob 122 which is manipulated for switch operation. As shown in FIG. 12, the angular extension 182 is adapted to be retained in the off, forward and reverse positions by four detents on the end wall 180 as at 183 which define three distinct positions for the switch actuator.

In order to control the speed of the propelling motor, the movable variable speed contact 126 is slidably mounted on the rod 178 and biased to the inactive position illustrated by means of a coiled spring 185 surrounding the rod 178 and grounded thereon against a pin 187 extending through the rod. The wire 125 from the battery is connected to the rod 178 and a circuit is made from the rod 178 to the slidable contact 126 which in turn engages the variable speed contacts 128, 129 and 130. In order to provide for manual adjustment of the contact 126, it extends upwardly through aligned longitudinal slots in the semicylindrical support 171, in the handle terminus 150 and in the rubber grip 151, where the knob 127 is accessible.

I claim:
1. A collapsible powered golf cart, comprising,
   a. a central upright frame,
   b. a collapsible leg structure pivotally mounted at each side of a midportion of the frame, each carrying a rotatable wheel,
   c. golf bag support means disposed on the frame,
   d. a power unit support bracket on one leg structure extending upwardly and outwardly over the adjacent wheel,
   e. a power unit including a housing supported on said support bracket at a position outside of the wheel associated with said one leg structure, and
   f. a motor unit in the housing connected to drive the adjacent wheel so that the cart may be propelled by the power unit and collapsed with the power unit in position.

2. A cart as defined in claim 1 including a disengageable clutch connecting said motor unit and the adjacent wheel so that the cart may free-wheel in event of motor failure.

3. A cart as defined in claim 1 including a disconnectible coupling connecting the motor unit and the wheel so that the motor unit may be disconnected from the wheel, and means removably mounting the power unit housing on said support bracket.

4. A cart as defined in claim 1 including means removably mounting the power unit housing on the support bracket.

5. A collapsible powered golf bag cart, comprising,
   a. an upright frame,
   b. a collapsible leg structure pivotally mounted at each side of a midportion of the frame, each carrying a wheel support bracket movable between extended and retracted positions relative to the frame,
   c. a wheel rotatable on each support bracket,
   d. golf bag support means disposed on the frame so that the center of gravity of the frame is located forwardly of the axis of the wheels and the lower end of the frame rests on the ground for stability when the cart is unattended,
   e. a motor unit support bracket on one wheel bracket,
   f. a motor unit on the support bracket including a housing disposed outside of the adjacent wheel approximately on the axis thereof,
   g. a battery unit support bracket on the other wheel bracket
   h. a battery unit on the last mentioned support bracket including a housing disposed outside of the adjacent wheel approximately on the axis thereof,
   i. a motor in the motor housing connected to drive the adjacent wheel, and
   j. a battery in the battery unit housing providing power for the motor.

6. A cart as defined in claim 5 including a handle extending from an upper portion of the frame, a motor control on the handle, and means connecting the motor control in circuit with the battery and the motor.

7. A cart as defined in claim 6 wherein said motor control includes a switch for deenergizing the motor or energizing the motor forwardly or reversely, and means for varying the speed of the motor.

8. A cart as defined in claim 5 including a disconnectible coupling connecting the motor and the adjacent wheel, means removably mounting the motor unit housing on its support bracket, and means removably mounting the battery unit housing on its support bracket so that the motor unit and battery unit may be removed when the cart is collapsed.

9. A cart as defined in claim 5 including a disengageable clutch connecting the motor and the adjacent wheel so that the cart may be moved freely in event of motor failure.

10. A cart as defined in claim 5 wherein the motor support bracket and the battery support bracket each comprises an inverted U-shaped member extending upwardly from the associated wheel bracket, outwardly over the adjacent wheel and downwardly outside the adjacent wheel.

11. A collapsible two-wheel powered golf bag cart, comprising,
   a. a central upright frame,
   b. a collapsible leg structure pivotally mounted at each side of the frame each carrying a support bracket for a wheel and movable between extended and retracted positions,
   c. a collapsible handle attached to an upper portion of the frame extendable to a position accessible for manipulating the cart,
   d. means connecting the handle and the leg structures for extending the latter,
   e. means for locking the handle and leg structures in extended positions,
   f. golf bag support means disposed on the frame so that the center of gravity of the frame is located forwardly of the axis of the wheels and the lower end of the frame engages the ground for stability when the cart is unattended,
   g. a power unit including a housing removably supported on one wheel bracket and disposed outside the adjacent wheel,
   h. a motor unit in the housing including a drive motor and a drive shaft driven by the motor,
   i. a disengageable coupling connecting the drive shaft and said one wheel,
   j. a battery unit including a housing supported on the other wheel bracket outside of the other wheel and including a battery for supplying power to the motor,
   k. an on-off-reverse switch on the handle in circuit with the battery and the motor,
   l. resistance means in the motor housing in circuit with the motor for varying the speed thereof, and
   m. means on the handle connected for varying the resistance in the housing.

12. A powered golf bag cart, comprising
   a. a frame including a central upright support and leg structures attached to opposite sides of a mid portion of the support, each carrying a rotatable wheel,
   b. a handle extending from an upper portion of the support for manipulating the cart,
   c. golf bag holder means on the support,
   d. an electric motor mounted on one of said leg structures and connected to drive one of the wheels to propel the cart,
   e. battery means mounted on the frame in circuit with the motor,
   f. resistance means adjacent the motor in circuit with the battery and motor for varying the speed of the motor, and
   g. circuit control means including an on-off-reverse switch on the handle in circuit with the battery and motor, and means on the handle connected in circuit with the resistance means for varying the speed of the motor.

13. A powered two-wheel golf bag cart, comprising,
   a. a frame including a central upright support and leg structures attached to opposite sides of a mid portion of the support each carrying a rotatable wheel,
   b. a hollow handle including a shaft extending from an upper portion of the support and having a terminal portion with a hand grip disposed transverse to the axis of the shaft for manipulating the cart,
   c. golf bag holder means on the support,
   d. an electric motor mounted on the frame and connected to drive one of the wheels to propel the cart,
   e. battery means mounted on the frame in circuit with the motor,
   f. circuit control means on the hand grip at one end thereof for manipulation by the thumb and/or forefinger,
   g. wiring in the handle connecting the battery, the motor and the control means, and
   h. means mounting the terminal portion of the handle for rotation approximately 180° about the axis of the shaft to dispose said one end of the hand grip laterally at one side or the other, for use by the right hand or the left hand of a golfer.

14. A golf bag cart as defined in claim 13, including a forward-reverse-off switch on the hand grip in circuit with the battery and the motor, resistance means adjacent the motor in circuit with the battery and motor for varying the speed of the motor, and switch means on the handle connected in circuit with the resistance means for varying the speed of the motor.

15. A golf bag cart as defined in claim 14, wherein the forward-reverse-off switch includes a lever at the end of the hand grip pivotable about an axis parallel to the axis of the hand grip.

16. A golf bag cart as defined in claim 14, wherein the speed control switch means includes an actuator movable longitudinally parallel to the axis of the hand grip.

* * * * *